United States Patent Office 2,714,110
Patented July 26, 1955

2,714,110

SUBSTITUTED TRIAZOLES AND METHOD OF PREPARING SAME

John S. Webb, Warren Township, Somerset County, and Andrew S. Tomcufcik, Somerville, N. J., assignors to American Cyanamid Company, New York, N. Y., a corporation of Maine No Drawing. Application March 19, 1954, Serial No. 417,500

9 Claims. (Cl. 260—308)

This invention relates to new organic compounds. More particularly, it relates to 4(5)-amino-1H-1,2,3-triazole-5(4)-carboxylic acid and derivatives thereof and methods of preparing the same.

We have found that when substituted triazolo[d]-pyrimidines are reacted with alkaline substances, amino carboxytriazoles or derivatives thereof are obtained. These compounds can be illustrated by one of the following structural formulas:

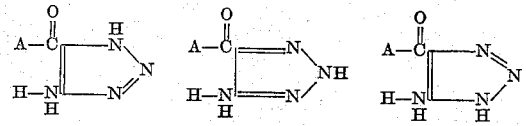

in which A is a hydroxyl, amino or hydrazino radical.

The compounds of the present invention are white crystalline solids with comparatively high melting points. They are soluble in water, particularly in the presence of alkali.

These compounds are prepared by heating a 5,7-disubstituted-v-triazolo[d]pyrimidine with alkaline substances under aqueous conditions. The nature of the group A in the general formulas above is dependent upon the alkaline substance used in the reaction. When a strong base such as an alkali metal hydroxide is used, then A is a hydroxyl radical. On the other hand, when ammonium hydroxide is used, the compounds obtained are those in which A is an amino radical. The base hydrazine produces compounds wherein A is a hydrazino radical.

In carrying out the present reaction the intermediates can be compounds such as 1H-v-triazolo[d]pyrimidin-5,7 - diol; 5-amino-1H-v-triazolo[d]pyrimidin-7-ol; 7-amino-1H-v-triazolo[d]pyrimidin-5-ol; 5,7-diamino-1H-v-triazolo[d]pyrimidine, and the like.

The temperature at which the reaction may be carried out can vary from 75° to 200° C., depending upon the strength of the alkaline substance and the intermediates used. For example, the 5,7- dihydroxytriazolo[d]pyrimidines react more readily than do the corresponding 5-amino-7-hydroxy compounds. When the alkaline substance is an alkali metal hydroxide or hydrazine a temperature of about 100° C. for a few hours is sufficient. However, when ammonium hydroxide is used, heating up to 200° C. for a longer period of time is necessary.

The compounds of the present invention are useful as vasodilators. Some members of the group are analogs of naturally occurring purine precursors and are useful in the study of purine metabolism, and the growth inhibition of plant viruses. They are incorporated into the nucleic acids of the organisms and thus inhibit the growth of certain viruses and bacteria.

The following examples describe in detail the preparation of representative compounds of the present invention. All parts are by weight unless otherwise indicated.

EXAMPLE 1

5(4)-amino-1H-1,2,3-triazole-4(5)-carboxylic acid 171 parts of 1H-v-triazolo[d]pyrimidin-5,7-diol monohydrate, 900 parts of 50% sodium hydroxide and 900 parts of water are refluxed together for five hours. The resulting solution is cooled and adjusted to a pH of 7 with concentrated hydrochloric acid. The neutral solution is treated with decolorozing carbon, ten parts, clarified and acidified with concentrated hydrochloric acid. The resulting white crystalline precipitate is filtered off, washed with cold water and dried to give 110 parts of product. This compound has a melting point which varies from 155–165° C. depending on the rate of heating. A sample inserted in a bath preheated to 155° C. and raised at the rate of 2° per minute melts with decomposition at 160–161° C.

EXAMPLE 2

5(4)-amino-1H-1,2,3-triazole-4(5)-carboxamide 100 parts of 1H-v-triazolo[d]pyrimidin-5,7-diol and 2000 parts of 29% ammonium hydroxide are placed in a stainless steel autoclave and heated at 185–190° C. while being shaken during 15 hours. After cooling to room temperature, the charge is emptied and then concentrated to dryness under reduced pressure on the steam bath. The residual solid is taken up on a boiling solution of 10 parts of acetic acid and 500 parts of water. After clarification with activated charcoal and filtration the cooled filtrate deposits 37 parts of crude 5(4)-amino-1H-triazole-4(5)-carboxamide. Recrystallization from 450 parts of water gives 29 parts of pure product (35%), melting point 226–227° C. (with decomposition).

EXAMPLE 3

5(4)-amino-1H-1,2,3-triazole-4(5)-carboxylic acid hydrazide 5.0 parts of 1H-v-triazolo[d]pyrimidin-5,7-diol and 25 parts of 100% hydrazine hydrate are refluxed together for 16 hours. A clear solution is obtained. It is concentrated under reduced pressure on the steam bath to remove the excess hydrazine. The residual semi-solid is triturated with 50 parts of water and the slurry is then made barely acid with acetic acid. The solid is filtered off, washed with 100 parts of water and then dried at 100° C. The crude product is dissolved in 30 parts of water and 5 parts of concentrated hydrochloric acid. After clarification with activated charcoal, the filtrate is mixed with 35 parts of concentrated hydrochloric acid. A fine white precipitate is obtained. It is collected, washed with 80 parts of ethanol and dried at 100° C. The purified product on analysis for carbon, hydrogen, nitrogen and chlorine agrees closely with the theoretical values for the monohydrochloride of 5(4)-amino-1H-1,2,3-triazole-4(5)-carboxylic acid hydrazide.

EXAMPLE 4

5(4)-amino-1H-1,2,3-triazole-4(5)-carboxamide 200 parts of 5-amino-1H-v-triazolo[d]pyrimidin-7-ol and 2000 parts of 29% ammonium hydroxide are reacted together exactly as described in Example 2. Working up the reaction mixture in a manner similar to that of Example 2 gives 5(4)-amino-1H-1,2,3-triazole-4(5)-carboxamide.

We claim:
1. Compounds having the general formula:

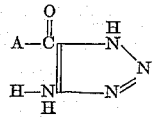

in which A is a member of the group consisting of hydroxyl, amino and hydrazino radicals.

2. 5(4)-amino-1H-1,2,3-triazole-4(5)-carboxylic acid.
3. 5(4)-amino-1H-1,2,3-triazole-4(5)-carboxamide.
4. 5(4)-amino-1H-1,2,3-triazole-4(5)-carboxylic acid hydrazide.
5. A method of preparing compounds having the formula:

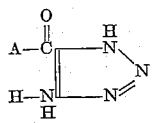

in which A is a member of the group consisting of hydroxyl, amino and hydrazino radicals which comprises heating a triazolo pyrimidine having the formula:

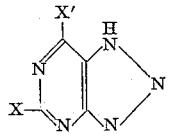

in which X and X' are members of the group consisting of hydroxyl and amino radicals, under aqueous alkaline conditions at a temperature within the range of 110° C. to 200° C. and recovering said compound therefrom.

6. A method of preparing 5(4)-amino-1H-1,2,3-triazole-4-carboxylic acid which comprises heating 1H-v-triazolo[d]-pyrimidin-5,7-diol with sodium hydroxide in aqueous solution at a temperature within the range of 110° C. to 200° C.

7. A method of preparing 5(4)-amino-1H-1,2,3-triazole-4(5)-carboxamide which comprises heating 1H-v-triazolo[d]pyrimidin-5,7-diol with ammonium hydroxide at a temperature within the range of 110° C. to 200° C.

8. A method of preparing 5(4)-amino-1H-1,2,3-triazole-4(5)-carboxylic acid hydrazide which comprises heating 1H-v-triazolo[d]pyrimidin-5,7-diol with hydrazine hydrate at a temperature within the range of 110° C. to 200° C.

9. A method of preparing 5(4)-amino-1H-1,2,3-triazole-4(5)-carboxamide which comprises heating 5-amino-1H-v-triazolo[d]pyrimidin-7-ol with ammonium hydroxide at a temperature within the range of 110° C. to 200° C.

References Cited in the file of this patent

UNITED STATES PATENTS 2,407,204     English et al. _____ Sept. 3, 1946